United States Patent [19]

Orthoefer

[11] 4,125,630

[45] Nov. 14, 1978

[54] PLIABLE VEGETABLE PROTEIN PRODUCTS

[75] Inventor: Frank T. Orthoefer, Decatur, Ill.

[73] Assignee: A. E. Staley Manufacturing Company, Decatur, Ill.

[21] Appl. No.: 744,205

[22] Filed: Nov. 22, 1976

[51] Int. Cl.$^2$ ............................................. A23J 3/00
[52] U.S. Cl. ................................. 426/104; 426/574; 426/656; 426/802
[58] Field of Search ............... 426/104, 574, 656, 802

[56] References Cited

U.S. PATENT DOCUMENTS

| | | | |
|---|---|---|---|
| 2,874,049 | 2/1959 | Pader et al. | 426/656 |
| 3,736,148 | 5/1973 | Katz | 426/104 X |
| 3,769,029 | 10/1973 | Ganz | 426/656 X |
| 3,891,774 | 6/1975 | Baker et al. | 426/104 |
| 3,904,769 | 9/1975 | Sair et al. | 426/104 |

*Primary Examiner*—Robert A. Yoncoskie
*Attorney, Agent, or Firm*—M. Paul Hendrickson; Charles J. Meyerson

[57] ABSTRACT

Pliable vegetable proteins suitable for use as extenders or textured vegetable proteins in meat analogs are prepared by forming a homogeneous aqueous dispersion of water-soluble vegetable protein and edible plasticizers, drying and heat-denaturing the dispersion so as to form a friable mass and hydrating the mass with an aqueous acid to convert the hydrate to a pliable protein product. Illustrative product formulating ingredients include soy protein concentrates, polyols, triglycerides and lactic acid as an acidulant.

29 Claims, No Drawings

PLIABLE VEGETABLE PROTEIN PRODUCTS

SUMMARY OF THE INVENTION

This invention relates to pliable textured vegetable proteins, meat analogs formulated therewith and processes for preparing these proteins and analogs.

BACKGROUND OF THE INVENTION

Meat analogs containing fibrous, vegetable proteinaceous materials (often referred to as textured vegetable proteins) are used as meat substitutes. Meat analogs may be prepared by combining the textured vegetable protein with an edible binder, fats, flavoring agents, etc. and fabricated so as to resemble natural meat cuts. Hydrated, textured vegetable proteins are also used as proteinaceous diluents or extenders in comminuted meat products.

Spinning and extrusion processes are the predominant source of textured vegetable proteins which are used for human consumption. The spinning processes are analogous to the manufacture of synthetic textiles. In the spinning processes, aqueous vegetable protein isolate solutions are typically passed through a spinnerette into a coagulating bath so as to form filaments which are then stretched and collected as filaments or a tow upon collecting reels (e.g., see U.S. Pat. No. 2,682,466). The textured vegetable protein extrusion processes are similar to those processes which are conventionally used to manufacture extruded cereal, snack and plastic products. A typical extrusion process entails forcing a protein-water mix through an extrusion barrel under elevated temperature and pressure so as to form a molten mass, and extruding the molten mass through a die orifice into a zone of reduced temperature and pressure to solidify the cooked vegetable protein mass.

When natural meat textures and appearances are an important criteria, the spun protein fibers are recognized by many as best suited. Meat analogs closely resembling the appearance of diced ham and chicken cuts, breakfast slices, links and sausages have been produced on a commercial basis with spun fibers. Unfortunately, the adaptability and compatibility of the spun protein fibers to a broad spectrum of products, as required by the meat industry and the consuming public, is limited by certain inherent physical and chemical deficiencies of spun fibers. Moreover, complex purification and recovery processes in combination with different fabrication techniques are often needed in order to produce satisfactory meat analogs from these spun fibers. These factors, plus others, generally contribute to a high-cost meat analog which frustrates the low-cost meat replacement objective.

Although the protein extrudates are considerably less expensive to produce and convert to a meat analog, they have limited utility as a meat replacement. These protein extrudates possess several inherent deficiencies which have seriously limited their use as a spun filament protein substitute. Unlike the spun filament protein products, the extruded vegetable proteins typically fail to possess a fibrous meat-like structure sufficiently comparable in character to the meat-like texture normally associated with natural meat cuts. Consequently, the protein extrudates are most frequently used as a partial replacement or extender in ground meat products such as chili, meat patties, meat loaf, stews, casseroles, etc. For meat analogs wherein a fibrous meat-like appearance, texture, taste, flavor, mouth-feel, cooking characteristics, etc. are an important criteria (e.g., diced meat analogs resembling natural or diced meat cuts, sea foods, sausages, etc.), the protein extrudates leave much to be desired.

Numerous alternative methods and variations for producing textured vegetable proteins and meat analogs have been proposed. Illustrative thereof are U.S. Pat. Nos. 3,108,873 by J. R. Durst; 3,886,299 by Feldbrugge et al.; 2,802,737 by Anson et al.; 3,886,298 by Hayes et al.; 3,814,823 by Yang et al.; 3,935,319 by Norman Howard; Re 27,790 by Rusoff et al.; 3,904,769 by Sair et al.; 3,765,902 by Wayne Charter; Canadian Patent No. 978,414 by Oborsh et al.; Japanese Publication No. NS 20361/72 by K. K. Kuraray; U.S. Published Patent Application No. B 478,759 by Balaz et al.; U.S. Pat. Nos. 3,891,774 by Baker et al.; 3,719,498 by Leidy et al.; 3,736,148 by Morris H. Katz; 3,900,576 by Arthur A. Schultz; and 3,836,678 by Leidy et al.

OBJECTS

An object of the present invention is to provide textured vegetable protein products of improved organoleptic properties and usefulness in the preparation of meat analogs.

Another object of the invention is to provide a more versatile method for preparing textured vegetable proteins and simulating the desired meat-like properties in a wider variety of meat analog products.

A further object is to provide pliable, textured vegetable proteins which may be specifically tailored for a specified meat analog end-use and meat analogs thereof.

DESCRIPTION OF THE INVENTION

According to the present invention there is provided a method for preparing pliable, fibrous protein products, said process comprising:
 (a) preparing a homogeneous aqueous dispersion comprised of water as a principle constituent, and as minor constituents an edible plasticizer and vegetable proteinaceous material which contains at least 30% by weight vegetable protein (dry substance basis) with a major portion of said vegetable protein of said proteinaceous material being in the water-soluble form;
 (b) subjecting the homogeneous aqueous dispersion to an elevated temperature for a period of time sufficient to coagulate the vegetable protein and to dry the aqueous dispersion to a water content of less than 20% (total weight basis) and thereby obtain a dry, heat coagulated, friable, proteinaceous mass; and
 (c) hydrating the dry, friable, proteinaceous mass in the presence of an edible acidulant to convert the dry, friable mass to a pliable, fibrous protein product.

In order to produce the pliable textured vegetable protein products of this invention, an aqueous dispersion containing water-soluble, heat-denaturable, vegetable proteinaceous material and an edible plasticizer is initially prepared. Simple, conjugated and/or modified proteins may be used for this purpose. Illustrative heat-denaturable vegetable proteinaceous materials include proteins obtained from oil-bearing seed materials such as peanuts, cottonseed, soybeans, sesame, safflower, sunflower, corn, etc. Dehulled raw seed materials as well as protein fractions and isolates thereof (e.g., globulins, prolamines, glutelins, scleroproteins, etc.) and other chemically or physically modified forms of a heat-denaturable or heat-coagulable protein may be used as the vegetable protein.

Proteinaceous materials from the leguminous oil-bearing seeds are advantageously employed as a protein source. In the preferred embodiments of this invention at least a major portion of the proteinaceous material is a soya protein. Illustrative soya proteins include full fat, partially defatted or fully defatted soybean meals and flours, soy protein concentrates (e.g., see U.S. Pat. No. 3,734,901 by L. P. Hayes et al.), soya protein isolates, chemically and/or enzymatically modified soya proteins (e.g., hydrolyzates, salts, etc.), mixtures thereof and the like.

The vegetable proteins may contain or be partially replaced or supplemented with non-vegetable proteins. These non-vegetable proteins are not needed to achieve a meat-like character, but can be effectively used to improve upon the essential amino acid balance. Typical non-vegetable proteins which may be used (in minor amounts on a total protein dry weight basis) include proteins derived from marine, animal, poultry, microbial and other non-vegetable protein sources. For most applications, the textured vegetable proteins herein will contain on a total dry protein weight basis more than about 75% total weight protein (usually more than 90%) derived from leguminous oil-bearing seed materials.

The aqueous dispersion contains an edible plasticizer which imparts flexibility, resiliency and pliability to the textured vegetable products of this invention. These edible plasticizers function as an internal lubricant to overcome the attractive forces between the protein molecules, prevent inter-meshing therebetween and advantageously increase the moisture holding capacity of the hydrated textured vegetable proteins. In general, these plasticizers have boiling points greater than water (e.g., B.P. greater than 150° C.). The edible plasticizers are uniformly dispersed throughout the aqueous dispersion and function as internal plasticizers for the dry and hydrated textured vegetable protein products. Both hydrophilic and hydrophobic plasticizers may be used.

Suitable hydrophilic plasticizers include edible polyols and edible surfactants. Polyols and/or surfactants in combination with the heat-coagulated proteins measurably enhance the moisture holding power of the hydrated product.

Liquid and solid polyols, such as conventionally used as humectants in food products, are effective plasticizers. Illustrative polyols include polyhydric alcohols such as glycerols, propylene glycol, polyalkylene glycols such as polyethylene glycol and propylene glycol (especially those of a molecular weight less than about 5,000), the sugar alcohols (e.g., straight chain tetra, penta and hexahydric alcohols such as mannitol and sorbitol); carbohydrate and saccharide humectants such as dextrose, fructose, lactose, maltose, maltotriose, raffinose, molasses, honey, brown sugar, papalon, fruit juices, sorghum, mixtures thereof and the like. The suitability or non-suitability of a particular polyol will depend largely upon the desired meat-analog. In certain meat analogs, sweetness is undesirable for which purpose a polyol of a low sweetening power is used as a polyol. If desired, the relatively high molecular weight polyols such as the water-dispersible polysaccharide film-formers may be used as plasticizers. These polysaccharides will increase the water absorbtive capacity of the textured vegetable proteins. Illustrative synthetic and natural polysaccharide film-formers which may be used for this purpose include cellulose derivatives such as sodium carboxymethyl cellulose, hydroxy propylmethyl cellulose ethers, carboxymethyl cellulose, hydroxypropylethyl cellulose ether, hydroxypropyl cellulose ether; the tree and shrub extracts such as tragacanth, arabic, ghatti, furcelleran and its salts (sodium, calcium, potassium and ammonium salts), karaya, seaweed colloids such as agar, carrageenin and its salts (e.g., ammonium, calcium, potassium, sodium, etc.), the alginates (e.g., the calcium, potassium, sodium alginates and propylene glycol alginates), modified food starches such as pregelled starches and starch derivatives (e.g., starch ether, ester, dextrins, maltodextrins); pectins, low methoxyl pectin and sodium pectinate; seed extracts such as locust bean, quince, oat gum and guar gum and other gum-like natural and synthetic hydrophilic colloids such as dextran and certain biologically produced polysaccharides such as disclosed in U.S. Pat. No. 3,301,848 by Frank E. Halleck; Xanthamonas compestris produced polysaccharides such as disclosed in the "Canadian Journal of Chemistry" Vol. 42 (1964), pages 1261-1269, mixtures of hydrophilic colloids and the like. Polyol additives which have a molecular weight in excess of 1,000 are typically used in an amount less than 5% of the total dry substance textured vegetable protein weight and most usually below the 2% level.

Edible surfactants also enhance the water absorbent properties of the textured vegetable proteins. Conventional edible anionic, non-ionic and cationic surfactants are useful. Illustrative surfactants, which may be used alone or in combination with other edible plasticizers, include edible surfactants such as disclosed in U.S. Pat. No. 3,620,763 (e.g., see column 9, line 13 - column 10, line 7), Handbook of Food Additives, 2nd Ed. CRC Press (e.g., see pages 397-429), both of which are incorporated herein by reference.

The edible triglycerides have also been found to be effective plasticizers. Applicable triglycerides are well known and generally comprise liquid or semi-liquid or solid glycerides which are conventionally derived from animal, vegetable, or marine fats and oils, including synthetically prepared shortening. These glycerides can contain saturated or unsaturated "long chain" acyl radicals having from about 12 to about 22 carbon atoms and are generally obtained from edible fats and oils such as cottonseed oil, soybean oil, coconut oil, rapeseed oil, peanut oil, olive oil, palm oil, palm kernal oil, sunflower seed oil, rice bran oil, corn oil, sesame seed oil, safflower oil, whale oil, lard, tallow and the like. These glycerides can also contain, in part, one or two short chain acyl groups having from 2 to about 6 carbon atoms such as acetyl, propanoyl, butanoyl, valeryl and caproyl; they can be prepared by random or low-temperature inter-esterification reactions of fatty triglyceride-containing oils and fats, such as inter-esterified or rearranged cottonseed oil and lard; and they can be otherwise formed by various organic synthesis. Triglycerides having a melting point of less than about 105° F. are most suitable, such as soybean oil, cottonseed oil, corn oil, coconut oil and other similar liquid vegetable oils. Triglycerides having melting points within about the 80°-100° F. range (preferably 90°-98° F.) improve the mouth-feel and textural characteristics of the textured vegetable proteins herein.

When edible triglyceride oils or fats are employed as a plasticizer, it is necessary to uniformly disperse the triglyceride throughout the textured vegetable protein product. Uniform distribution of these triglycerides may easily be achieved by uniformly dispersing the triglycerides throughout the aqueous dispersion prior to forming the solid and dry textured vegetable protein product. Conventional techniques and additives for placing oils into uniform aqueous dispersion such as oil emulsification and oil-suspension (e.g., protective colloids, stabilizers and thickeners such as acacia, tragacanth, alginates, starch, casein, methyl cellulose, sodium salts of condensed alkylated aryl sulfonic acids, activated carbon, alumina gel, bentonite, etc.) may be effectively used to facilitate uniform distribution of the triglycerides throughout the aqueous external phase. Similar water-miscible solvents for fats and oil (e.g., ethanol, glycerol and propylene glycol and other binder plasticizers, n-butyl alcohol, butyl butyrate, butyl ethyl ether, ethyl butyrate, etc.), may be used to aid in the uniform dispersion of the triglycerides into the aqueous phase. Many unrefined oil-bearing seed materials (e.g., fullfat soybean flakes) contain natural surfactants (e.g., lecithin) and protective colloids which facilitate the uniform dispersal of triglycerides into aqueous systems. Since unrefined oil-bearing seed materials may be used to prepare the present textured vegetable protein, indigenous oil dispersants therein can be effectively used to uniformly disperse triglycerides into the aqueous phase. The refining processes, which are conventionally used to prepare vegetable protein and oil fractions, remove a substantial portion of these indigenous oil dispersants. When the refined fractions are used, it is generally necessary to incorporate dispersants or surfactants (especially at relatively high triglyceride and water levels) into the aqueous media to effectively disperse or emulsify the triglycerides into the aqueous phase.

Many meat analog flavoring and coloring additives are hydrophobic. The edible plasticizers employed herein may be effectively used as a carrier or dispersant for these additives in both the textured vegetable product and during the processing thereof. Triglycerides in combination with either the edible polyols or the surfactants are particularly useful for this purpose. The overall processing conditions employed in preparing the textured vegetable proteins herein are less severe than those employed in conventional extrusion processes. Accordingly, volatile and heat-sensitive flavoring additives may be incorporated into the aqueous dispersion as a composite part of an internal phase of minute triglyceride globules. The internal triglyceride phase in conjunction with continuous external aqueous protein phase inhibits flavor volatilization and protects the flavor from degrading during the subsequent relatively mild heat treatment thereof. This affords a convenient and effective way to incorporate high levels of flavoring agents into textured vegetable proteins while maintaining its potency and flavor throughout the textured vegetable protein and meat analog processing cycle.

The relative proportions of edible plasticizers and vegetable proteins can vary considerably. The most suitable proportions will depend largely upon the type of textured vegetable protein product which is desired and the specific plasticizer or combinations used in its preparation. The edible plasticizer level may range from about 0.5 to about 250 parts by weight plasticizer or higher for each 100 parts by weight protein (dry substance weight basis) with a level of about 5 to about 150 parts by weight being applicable to most of the textured vegetable proteins herein.

On a comparative basis, the triglyceride may be used at a substantially higher level than the hydrophilic plasticizers provided the aqueous dispersion contains a sufficient amount of oil dispersant for its uniform dispersion into the aqueous dispersion. Illustrative triglyceride levels range from about 0 to about 200 parts triglyceride with an amount ranging from about 50 to about 150 parts by weight for each 100 parts by weight protein being most typical for textured vegetable proteins prepared in accordance with this invention.

At excessively high concentrations, the low molecular weight polyols and edible surfactants generally impart an off-flavor. When polyols are employed, they are typically used in amounts less than about 50 parts by weight for each 100 parts by weight protein with amounts ranging from about 1 to about 30 parts by weight being most typical. The most suitable surfactant level depends upon the textured vegetable protein ingredient system. If used, the surfactants are generally present in an amount less than about 20 parts by weight (100 parts dry protein) with levels of about 5 to about 15 parts by weight being most typical.

In preparing the aqueous dispersion, water is used as the principal ingredient. Unlike extrusion processes which typically utilize dry solids as a major constituent with minor amounts of water, the aqueous dispersions herein are most suitably prepared by employing dry solids in minor amounts. In general, aqueous dispersions containing on a total weight basis from about 10% to about 40% dry substance (preferably about 20–30%) may effectively be used to prepare the present textured vegetable proteins. The uniform aqueous dispersion may be prepared via conventional mixing and homogenization techniques. To preserve the protein film-forming properties, the temperature of the aqueous dispersion should be maintained below the heat-coagulation temperature of the protein. Elevated temperatures for relatively short periods of time which do not denature the protein or its film-forming properties are useful in enhancing the uniform protein dispersion into the aqueous phase. The aqueous dispersion is typically prepared below 200° F. (e.g., about 120° to 180° F.) and preferably at 140° F. or higher (e.g., about 155° F. to 165° F.)

At a neutral pH, undenatured vegetable proteins contain both insoluble and water-soluble fractions. Under more acidic (e.g., below pH 4.0) or alkaline conditions (above pH 7.5), the solubles increase substantially. By adjusting the aqueous dispersion pH to either an acidic pH between about 1.5 to about 3.5 (preferably between about 2 to about 2.5) or a basic pH from 7.5 to about 9.5 (preferably about pH 8–9), the protein will more uniformly disperse into the aqueous phase without adversely affecting its film-forming properties. This provides a protein substrate which can be dried into a more uniform and oriented protein product. More highly acidic or basic conditions (e.g., below 2.0 or above 9.5) may be used provided excessive hydrolysis and protein film-forming losses (e.g., short exposure at low temperatures, etc.), do not occur. Alternatively, protein water-solubility may be increased by chemical or enzymatic hydrolysis which does not impair the film-forming and heat-denaturable attributes of the vegetable protein (e.g., see U.S. Pat. No. 3,814,816 by Gunther).

The most suitable method for forming the homogeneous aqueous dispersions depends primarily upon its composition. Aqueous dispersions essentially free from hydrophobes may be prepared under relatively mild mixing conditions. The water-soluble polyols and/or surfactants can be readily dispersed into aqueous phase along with the vegetable protein by conventional mixing techniques (e.g., manual or mechanical mixing). If hydrophobic plasticizers such as the triglycerides are used, more vigorous and turbulent mixing conditions and devices (e.g., high-shear mechanical mixing devices such as high-speed blenders, colloid mills, dairy-type homogenizers, etc.) are usually required. Hydrophobes uniformly dispersed into the aqueous phase as an internal phase of minute or microscopic globules can be easily retained as encapsulated globules in the dried heat-denatured mass and the hydrated product.

After the homogeneous dispersion of edible plasticizers and vegetable protein has been prepared, the aqueous dispersion is subjected to an elevated temperature for a period of time sufficient to dry and heat-denature the protein to form a dry, solidified, heat-denatured proteinaceous mass. Temperatures in excess of 200° F. are required to heat denature the vegetable protein product. Protein heat-denaturization is dependent upon temperature and cooking time. For most applications, this heat denaturization will occur between about 225° F. to 500° F. In a few meat analog applications, a crisp, crunchy textured vegetable protein is desired (e.g., bacon). These crispy products generally require a relatively severe thermal treatment (e.g., 375°-475° F.). Other meat-like products which rely upon a more tender fiber structure (such as pork, chicken, etc.) are most suitably prepared at heat denaturization temperatures ranging from about 225° F. to about 275° F. High-quality textured vegetable proteins are predominantly obtained from dried masses which have been heat-denatured between about 250° F. to about 300° F.

Homogeneity of the edible plasticizer and proteinaceous material should be maintained during the drying and heat-denaturization so as to provide a solidified proteinaceous matrix with the edible plasticizer uniformly dispersed therein. Processing conditions which cause phase separation of either protein or plasticizer (e.g., syneresis, precipitation, etc.) should be avoided.

The dried masses are most conveniently prepared by compressing and drying the aqueous dispersion between heated rollers (e.g., double drumdrying, calendaring, etc.). Although single drum driers may be used, the dried masses are most suitably prepared in multiple drum driers. The extent of drying and heat denaturization should be sufficient to provide a dried mass which retains its structural fibrous integrity when hydrated with an edible acidulant. The dry mass contains a continuous external phase of fused and solidified heat-denatured protein. The dried mass moisture content will generally be less than 20% water with most dried masses advantageously being within the range of about 3 to about 15%. Storage-stable dried masses may be prepared by drum drying the mass to a moisture within about 13–17% moisture level and then permitting it to air dry to about 5–12% moisture at reduced temperatures or ambient conditions. The preferred moisture level for storage-stable, dried masses will range from about 7% to about 12%.

The proteinaceous mass drying and heat denaturization may be conducted in sequential steps. Processing efficiency and textural improvements, however, are best achieved by simultaneously drying and heat denaturing the dispersion and especially when conducted under conditions which shape the mass into thin shaped articles such as sheets, films, tubes, filaments, rods, fibers, etc. Dried masses of more than 0.030 inch have substantially poorer hydrated fibrous character than those of 0.015 inch thickness or less. Hydrated fibers prepared from dried masses of a thickness less than a 0.010 inch (preferably about 0.004 to about 0.008 inch) closely simulate the characteristics of natural meat fibers.

The relatively mild heat-denaturization processing conditions improves both the functionality and organoleptic attributes of the hydrated textured protein product. Protein degradation such as arises from excessively high temperature, pressure and shear conditions, etc. typically encountered in conventional extrusion processes are avoided.

If desired, the dried mass may be granulated by conventional comminution techniques (e.g., grinding, shearing, flaking, etc.) after the drying step to provide a fiber size best suited for a particular meat-analog end-use. At a moisture level below 12%, the dried mass is friable. This makes it difficult to achieve a uniform particle or fiber size by commutating the dried mass. This problem can be avoided by leaving a sufficient amount of residual moisture in the heat-denatured mass to permit its granulation in a uniform particle size (e.g., 14–20%) and thereafter drying it to a storage-stable moisture level.

When hydrated with water alone, the dry mass possesses insufficient pliability and structural strength to retain its fibrous identity for meat-analogs or meat extender applications. These hydrated fibers also have an inferior texture, mouth-feel and taste. Their poor pliability, resistance to abrasive forces and textural properties are believed to arise because of the low degree of heat-setting which is accomplished by the heat-denaturization. The drying and heat-denaturization orients and solidifies the protein from a substrate in which a major portion of the protein is in the water-soluble form. The acid treatment renders the protein water-insoluble. This results in a hydrated product having significantly improved pliability, strength, resistance towards comminution and an over-all, meat-like fibrous structure.

The functionality of the protein fiber relies upon the hydration and acidulant treatment combination. Acid treated and hydrated fibers which are dried revert back to their friable form. Although the dried masses may be sequentially hydrated and acid treated, or vice versa, significantly improved product uniformity and meat-like attributes are obtained by simultaneously hydrating and acid treating the fibers herein.

The acid treatment adjusts the pH of the hydrated mass to the protein isoelectric point. Factors such as protein source and treatment will affect the protein isoelectric point. In general the isoelectric point for most vegetable proteins falls within the pH range of about 4.0 to about 5.5 and predominately within the pH 4.2 to 4.8 range. Since natural meats are normally slightly acidic, the acid-treatment does not adversely affect its flavor in meat analogs. A wide variety of edible acidulant may be used. Illustrative acidulant include acetic acid, adipic acid, citric acid, fumaric acid, lactic acid, malic acid, phosphoric acid, propionic acid, succinic acid, succinic anhydride, tartaric acid, mineral acids, mixtures thereof and the like. Aqueous organic acidulant of $-\log K_a$ between about 3.0 to about 5.0 ($-\log K_a$ acid disassociation constant) preferably lactic, are particularly effective acidulant in providing excellent meat-like fibrous products. Strong acids under hydrating conditions which cause substantial protein hydrolysis or degradation should be avoided. Edible buffers may also be used to control and stabilize the aqueous acidulant hydrating media to the appropriate pH level.

The dried masses are advantageously hydrated in the presence of an edible salt. Edible salts reduce the free water content of the aqueous hydrated fibers and inhibit reversion of the protein to the water-soluble form. The edible salts are also imbibed and improve the fiber moisture holding power and improve its pliability. The edible salts in combination with the edible organic plasticizers may collectively reduce the free water (i.e., $A_w$) content of the fibers and thus stabilize it against microbial and enzymatic degradation. A wide variety of edible salts in varying proportions may be used. Representative salts include the alkali metal, the alkaline earth metal and ammonium salts of the aforementioned edible acidulant. Although relatively high salt concentrations are used in achieving improved pliability and $A_w$ stability, excessive saltiness can occur. Sodium chloride is the preferred edible salt. Depending upon the desired end-use of the hydrated textured vegetable protein, the salt concentration typically ranges from about 0 to about 4 parts by weight for each 100 parts by weight hydrating water or at about 0 to about 20% of the total protein dry weight with about 0 to about 5 parts by weight for each 100 parts by weight water in the hydrating medium and about 1 to about 4 parts by weight salt for each 20 parts by weight protein (dry weight basis) being preferred for most applications.

As mentioned above, more uniform fiber size distribution is achieved by comminuting the hydrated and acid treated fibers. The fibers are useful as meat-extenders or in meat-analogs. Conventional abrasive and grinding techniques (e.g., grinding, beating, shearing, flaking, etc.) prior to or during the meat analog preparation or meat extension may be effectively used to achieve the desired fiber size.

Meat analogs may be prepared by combining the hydrated fibers with conventional edible hydrophilic film-formers or binders. The hydrophilic film-formers may be conjointly added along with the edible acidulant and directly converted to a meat analog or post-added. Such hydrophilic film-formers form a matrix which cohesively binds together the discrete fibers into a unitary food piece. Suitable binders include water-soluble or water-dispersible, non-proteinaceous film-formers such as synthetic and/or the natural polysaccharide film formers as mentioned above, proteinaceous film-formers, mixtures thereof and the like. Polysaccharide and proteinaceous film-formers which coagulate upon heat-treatment are particularly useful.

In a more limited embodiment of the invention, the predominant binder (dry weight basis) for the meat-analog will comprise a heat-coagulable, hydrophilic film-forming composition. Vegetable protein materials mentioned above as well as proteins derived from animal, marine, poultry, microbial and cereal protein sources may be suitably used as meat-analog binders. Illustrative protein binders other than leguminous oil-bearing seed sources include wheat gluten, egg albumin, gelatin, casein, sodium and calcium caseinate, non-fat milk solids, whole egg, corn germ, fish protein, whey, mixtures thereof and the like. The protein films advantageously comprise at least a major portion of the total hydrophilic film-forming weight and preferably at least 90% of the total binder dry weight.

The proteinaceous fibers prepared in accordance with the invention are useful as extenders or analog components for a variety of vegetable, fruit, nut-like condiment, cereal snack, baby food, beverage, culinary, puddings, desserts, marine, poultry, beef, pork, etc.

products. The fibrous products herein may be conveniently formulated with other conventional food additives such as vitamins, antimicrobial agents, antioxidants, sequestrants, starches, natural and synthetic flavorings, flavor potentiators, non-nutritive and nutritive, color additives, etc. to achieve the desired functional end-use. The invention affords a low cost vegetable protein raw material substitute for expensive natural food ingredients, inexpensively processed to provide hydrated, heat-set, undegraded fibrous proteinaceous material which effectively simulate the texture, flavor, color, over-all appearance and mouth-feel of high-quality natural food products.

The following Examples are illustrative of the invention.

EXAMPLE I

An aqueous slurry consisting of 88.25% water and 10% soy protein concentrate, 0.5% lecithin (65 A.I.) and 1.25% glycerin (all on a dry % weight basis), was heated to 140° F., was adjusted to a pH 9.5 with 1N calcium hydroxide and vigorously mixed with a "Lightnin" mixer, to convert the water-insoluble protein to a water-soluble form and provide a homogeneous aqueous dispersion. The homogeneous dispersion was then continuously and simultaneously dried and heat-denatured on a double drum dryer. Clearance between the drums was 0.008 inch; steam pressure in the drums was 40 psig with the roll speed being adjusted to provide a continuous film. The resultant dried and heat-denatured sheets containing 15% moisture of an average thickness of 0.008 inch were then hydrated with aqueous lactic solution containing 5% sodium chloride (dry weight) at pH 4.2 for 10 minutes at ambient temperature (23° C.). The hydrated sheets were pliable. Total weight gain of the hydrated and acid treated mass was about 4 to 5 times the dried sheet weight.

A plurality of the hydrated, acid-treated pliable sheets were placed on top of one another (one-fourth inch total thickness) and compressed between cloth towels and a "Carver" press (100–200 psig) to provide a textured vegetable protein (⅛ inch thick) consisting of a plurality of laminar sheets cohesively bonded to one another to form a unitary piece. The laminated sheets were diced into cubes (one-fourth × one-eighth × one-eighth inch). The diced cubes (80% by weight) were slurried with 20% by weight whole egg whites and imitation chicken flavoring. The slurry was stuffed into sausage casing and steam-heated for 20 minutes to heat-coagulate the protein. The cooked stuffings had a texture, flavor and appearance which simulated high-quality, diced, natural, freshly cooked chicken breasts. The masticatory character of the diced pieces simulated cooked, diced chicken breasts. When kneaded between the thumb and forefinger the cooked, dices produced fibers similar to that of the natural product.

EXAMPLE II

An aqueous slurry containing 10% soy protein concentrate, 0.7% lecithin and 6.3% partially hydrogenated vegetable oil ("Durkex 500" manufactured by Glidden-Durkee Foods Co.) was prepared in a "Waring" blender. The aqueous slurry was heated to 120°–160° F. and homogenized in a hand homogenizer. The homogenized slurry was adjusted to a pH 9.5 (1N NaOH), mixed for 10 minutes at 160° F. to convert the soy protein to its water-soluble form.

The resultant homogeneous aqueous dispersion (comprised of a continuous aqueous external phase of water and water-soluble protein and an internal phase of minute oil globules uniformly dispersed and emulsified with lecithin) was heat-denatured and dried as a continuous, friable sheet (0.010 inch thick) under the drying conditions of Example I. The dried sheets were hydrated with an aqueous lactic acid-salt solution with excess water being removed from the sheets as in Example I.

A sausage analog containing about 16.4% protein, 16.4% fat and 40% dry solids with a texture, flavor, mouth-feel and appearance of a high-quality hot-dog was prepared from the pliable, hydrated protein sheets. This was accomplished by combining 71 parts by weight of the hydrated pliable (sliced and chopped) sheets with 11.6 parts by weight egg albumin solids along with added red coloring and smoke flavoring. The combined meat analog ingredients were converted into a homogeneous aqueous mass in a conventional blender operated at a high speed. The homogeneous mass was ground through a one-fourth inch extrusion plate with a "Hobart" grinder, stuffed into sausage casing, steamed at 212° F. for 10 minutes to heat-coagulate the egg albumin and cooled to provide the high-quality sausage product. The sausage analog fat was uniformly encapsulated and protected by two continuous protein phases. The fat was uniformly dispersed and encapsulated as minute fat globules within the continuous external vegetable protein phase of the hydrated texture protein vegetable pieces which in turn were homogeneously dispersed as an internal phase of discrete hydrated particles within the continuous external phase of the heat-coagulated egg albumin binder. The coloring and flavoring additives were uniformly distributed throughout the entire sausage product including the hydrated pieces which absorbed these additives. Due to the encapsulating effect of these two external phases (i.e., the soy protein of the textured pieces and egg albumin binder), the fat was stabilized against phase separation as well as oxidative and enzymatic deterioration under prolonged refrigeration and cooking conditions. The succulent taste, moistness, appearance, texture, mouth-feel, color and flavor of the cooked sausage was closely akin to that of high-quality, natural, meat sausage products.

EXAMPLE III

An egg white extender was prepared from an aqueous slurry which consisted of 10% soy protein concentrate (70% soy protein), 0.7% lecithin (60 A.I.) and 89.3% water. The slurry was adjusted to pH 9.0 with 1N calcium hydroxide, heated to 130° F., homogenized, heat-denatured and dried in accordance with Example II. The friable, dry sheets were ground in a "Wiley Mill" using a No. 30 screen. Hydrated particles were prepared therefrom by hydrating an equivalent weight of the dry particles in an aqueous lactic acid solution (pH 4.0) containing 3% by weight added sodium chloride. This resulted in a uniform suspension which would form a continuous solidified mass when heated in a steam bath for 10 minutes.

This suspension was used as an egg white extender by initially blending together an equivalent weight of reconstituted dried egg whites (9:1 water to dry egg white ratio) with the soy protein suspension. The egg white extender blend was then heated in a steam bath for 10 minutes to heat-coagulate the protein. The pouched mass had an appearance, texture and mouth-feel similar to pouched egg whites.

Soy protein concentrates consist essentially of soy protein and water-insoluble residue (mostly cellulosic fiber) at a weight ratio of 7:3 or higher. As food extenders and textured vegetable proteins, the soy protein content of the dried masses herein are advantageously at least 40% (d.s.b.) with protein levels of at least 50% (e.g., 50–75%) being typical for many end-uses.

Since many embodiments of this invention may be made and since many changes may be made in the embodiments described, the foregoing is interpreted as illustrative and the invention is defined by the claims appended hereafter.

What is claimed is:

1. A method for preparing pliable vegetable protein products, said method comprising:
   (a) preparing a homogeneous aqueous dispersion having an acidic pH between about 1.5 to about 3.5 or a basic pH from about 7.5 to about 9.5 comprised of water as a major constituent, and as minor constituents edible plasticizer and heat denaturable vegetable proteinaceous material wherein the protein content constitutes at least 25% of the non-aqueous substance weight with at least a major portion of the protein being in the water-soluble form;
   (b) subjecting the homogeneous aqueous dispersion to an elevated temperature for a period of time sufficient to heat-denature the vegetable protein and to dry the aqueous dispersion to a water content of less than 20%, thereby providing a dry, heat-denatured, friable, proteinaceous mass; and
   (c) hydrating the dry, friable, proteinaceous mass in the presence of an edible organic acid having a $Pk_a$ ranging from about 3.0 to about 5.0 or alternatively by adding said edible organic acid to the hydrated mass, said acid used in amount to provide a hydrated, pliable, fibrous vegetable protein product.

2. The method according to claim 1 wherein the aqueous dispersion comprises about 60% to about 90% water and about 10% to about 40% non-aqueous substance with said non-aqueous substance comprising from about 0.5 to about 250 parts by weight edible plasticizers for each 100 parts by weight vegetable proteinaceous material.

3. The method according to claim 2 wherein the aqueous dispersion is concurrently dried and heat-denatured by compressing, heating and drying the dispersion into a shaped mass having a thickness of less than 0.015 inch.

4. The method according to claim 3 wherein the vegetable proteinaceous material comprises at least 75% by weight of a protein derived from leguminous oil-bearing seed materials and the hydrated mass is treated with a sufficient amount of aqueous acid to provide a hydrated mass of a pH from about 4.0 to about 5.5.

5. The method according to claim 4 wherein the vegetable proteinaceous material of the aqueous dispersion comprises at least 40% by dry weight soy protein and the heat-denaturization and drying of the aqueous dispersion is conducted at a temperature between about 225° F. to 500° F.

6. The method according to claim 5 wherein the edible plasticizer comprises from about 1 to about 30 parts by weight polyol and the non-aqueous substance ranges from about 20% to 30% by weight.

7. The method according to claim 5 wherein the edible plasticizer comprises from about 50 to about 150 parts edible triglycerides.

8. The method according to claim 7 wherein the aqueous dispersion contains from about 5 to about 15 parts by weight edible surfactant for each 100 parts by weight proteinaceous material.

9. The method according to claim 1 wherein the aqueous dispersion on a 100 parts by weight proteinaceous material comprises at least 5 to about 250 parts by weight edible plasticizer, the non-aqueous substance ranges from about 10% to about 40% by weight, and at least 90% of the vegetable proteinaceous material comprises soy protein; and the aqueous protein dispersion is heat-denatured and dried into a mass of a thickness ranging from about 0.004 to less than 0.010 inch.

10. The method according to claim 9 wherein the aqueous dispersion comprises from about 50 to about 150 parts by weight triglycerides having a melting point ranging from 90° F. to 105° F. and emulsified as a discontinuous internal phase of minute globules with from about 5 to about 15 parts by weight surfactant within a continuous external phase comprises said water, proteinaceous material and from about 5 to about 15 parts by weight polyol with said parts based on 100 parts by weight proteinaceous material.

11. The method according to claim 10 wherein in addition to aqueous organic acid, the dried mass is hydrated in the presence of from about 1 to about 4 parts by weight edible salt for each 20 parts by weight proteinaceous material.

12. The method according to claim 10 wherein at least a major weight portion of said soy protein comprises soy protein concentrate.

13. The method according to claim 9 wherein the proteinaceous material is uniformly dispersed into the aqueous phase at a temperature from about 120° F. to about 180° F. and the protein is heat-denatured and dried at a temperature from about 225° F. to about 300° F.

14. The pliable vegetable protein product prepared in accordance with the method of claim 1.

15. The pliable vegetable protein product prepared in accordance with the method of claim 10.

16. The pliable vegetable protein product prepared in accordance with the method of claim 12.

17. The pliable, fibrous protein product prepared in accordance with the method of claim 13.

18. In a meat analog which comprises discrete textured vegetable protein fibers uniformly dispersed within an edible binder matrix, the improvement which comprises the inclusion of a pliable, fibrous vegetable protein product prepared by a method comprising:
(a) preparing a homogeneous aqueous dispersion having an acidic pH between about 1.5 to about 3.5 or a basic pH from about 7.5 to about 9.5 comprised of water as a major constituent, and as minor constituents edible plasticizer and heat denaturable vegetable proteinaceous material wherein the protein content constitutes at least 25% of the non-aqueous substance weight with at least a major portion of the protein being in the water-soluble form;
(b) subjecting the homogeneous aqueous dispersion to an elevated temperature for a period of time sufficient to heat-denature the vegetable protein and to dry the aqueous dispersion to a water content of less than 20% thereby providing a dry, heat-denatured, friable proteinaceous mass; and
(c) hydrating the dry, friable, proteinaceous mass in the presence of an edible organic acid having a $Pk_a$ ranging from about 3.0 to about 5.0 or alternatively by adding said edible organic acid to the hydrated mass, said acid used in amount to provide a hydrated, pliable, fibrous vegetable protein product.

19. The meat analog according to claim 18 wherein at least 90% of the total meat analog binder dry weight comprises a heat-coagulable protein and wherein said pliable, fibrous vegetable protein product is prepared such that at least 90% of the vegetable proteinaceous material comprises soy protein, the aqueous dispersion contains, on a 100 parts by weight proteinaceous material, from about 50 to about 150 parts by weight triglycerides having a melting point ranging from 90° F. to 105° F., from about 5 to about 15 parts by weight polyol and about 5 to about 15 parts by weight edible surfactant; wherein the triglycerides are emulsified into the aqueous dispersion by said surfactant to form a discontinuous internal phase of minute triglyceride globules homogeneously dispersed within a continuous external phase comprised of the water, the proteinaceous material and the polyol; and wherein the aqueous protein dispersion is heat-denatured and dried into a mass of a thickness ranging from about 0.004 to less than 0.010 inch.

20. The meat analog according to claim 19 wherein at least a major portion of said soy protein comprises soy protein concentrate.

21. The meat analog according to claim 19 wherein the vegetable proteinaceous material is homogeneously dispersed into the homogeneous aqueous dispersion at a temperature from about 120° F. to about 180° F.; and the protein is heat-denatured and dried at a temperature from about 225° F. to about 300° F.

22. In a method for preparing a meat analog wherein discrete textured vegetable protein fibers are uniformly dispersed and admixed with an edible heat-coagulable, hydrophilic film-forming binder to provide an admixture comprised of a continuous external phase of film-forming composition with the discrete fibers being uniformly dispersed therein and the admixture is heated at a temperature for a period of time sufficient to heat-coagulate the film-forming binder, the improvement which comprises uniformly dispersing and admixing with the binder, a pliable, fibrous vegetable protein product prepared by a method comprising:
(a) preparing a homogeneous aqueous dispersion having an acidic pH between about 1.5 to about 3.5 or a basic pH from about 7.5 to about 9.5 comprised of water as a major constituent, and as minor constituents edible plasticizer and heat denaturable vegetable proteinaceous material wherein the protein content constitutes at least 25% of the non-aqueous substance weight with at least a major portion of the protein being in the water-soluble form;
(b) subjecting the homogeneous aqueous dispersion to an elevated temperature for a period of time sufficient to heat-denature the vegetable protein and to dry the aqueous dispersion to a water content of less than 20% thereby providing a dry, heat-denatured, friable proteinaceous mass; and
(c) hydrating the dry, friable, proteinaceous mass in the presence of an edible organic acid having a $Pk_a$ ranging from about 3.0 to about 5.0 or alternatively by adding said edible organic acid to the hydrated mass, said acid used in amounts to provide a hydrated, pliable, fibrous vegetable protein product.

23. The method according to claim 22 wherein at least 90% of the total binder dry weight comprises a heat-coagulable protein and wherein said pliable, fibrous protein product is prepared such that at least 90% of the vegetable proteinaceous material comprises soy protein, the aqueous dispersion contains from about 50 to about 150 parts by weight triglycerides having a melting point ranging from 90° F. to 105° F., from about 5 to about 15 parts by weight edible surfactant, and from about 5 to about 15 parts by weight edible polyol, with said parts based on 100 parts by weight proteinaceous material; and wherein the triglycerides are emulsified with said surfactant to form a discontinuous internal phase of minute globules homogeneously dispersed within a continuous external phase of said water, said water-soluble protein and said polyol; and wherein the aqueous protein dispersion is heat-denatured and dried into a mass of thickness ranging from about 0.004 to less than 0.010 inch.

24. The method according to claim 23 wherein at least a major portion of said soy protein comprises soy protein concentrate.

25. The method according to claim 23 wherein the aqueous dispersion on a 100 parts by weight dry proteinaceous material comprises at least 5 parts by weight to about 250 parts by weight edible plasticizer the proteinaceous material is homogeneously dispersed into the aqueous dispersion at a temperature from about 120° F. to 180° F.; the aqueous protein dispersion is heat-denatured and dried into a mass of thickness ranging from about 0.004 to less than 0.010 inch at a temperature from about 225° F. to about 300° F.; and the dried mass is hydrated with an effective amount of aqueous lactic acid.

26. In a natural food product wherein a vegetable protein product is employed as a partial replacement or extender for the natural food product, the improvement which comprises the use of vegetable protein product prepared by a method comprising:
   (a) preparing a homogeneous aqueous dispersion having an acidic pH between about 1.5 to about 3.5 or a basic pH from about 7.5 to about 9.5 comprised of water as a major constituent, and as minor constituents edible plasticizer and heat denaturable vegetable proteinaceous material wherein the protein content constitutes at least 25% of the non-aqueous substance weight with at least a major portion of the protein being in the water-soluble form;
   (b) subjecting the homogeneous aqueous dispersion to an elevated temperature for a period of time sufficient to heat-denature the vegetable protein and to dry the aqueous dispersion to a water content of less than 20% thereby providing a dry, heat-denatured, friable proteinaceous mass; and
   (c) hydrating the dry, friable, proteinaceous mass in the presence of an edible organic acid having a $Pk_a$ ranging from about 3.0 to about 5.0 or alternatively by adding said edible organic acid to the hydrated mass, said acid used in amounts to provide a hydrated, pliable, fibrous vegetable protein product.

27. The food product according to claim 26 wherein at least 90% of the vegetable proteinaceous material weight in the aqueous homogeneous dispersion comprises soy protein, the aqueous dispersion contains, on a 100 parts by weight proteinaceous material from about 50 to about 150 parts by weight triglycerides having a melting point ranging from 90° F. to 105° F., from about 5 to about 15 parts by weight polyol and about 5 to about 15 parts by weight edible surfactant; and wherein the triglycerides are emulsified into the aqueous dispersion by said surfactant to form a discontinuous internal phase of minute triglyceride globules homogeneously dispersed within a continuous external phase comprised of the water, the proteinaceous material and the polyol; and wherein the aqueous protein dispersion is heat-denatured and dried into a mass of a thickness ranging from about 0.004 to less than 0.010 inch.

28. The food product according to claim 27 wherein at least a major portion of said soy protein comprises a soy protein concentrate.

29. The food product according to claim 27 wherein the vegetable proteinaceous material is homogeneously dispersed into the homogeneous aqueous dispersion at a temperature from about 120° F. to about 180° F., and the protein is heat-denatured and dried at a temperature from about 225° F. to about 300° F.

* * * * *